(12) United States Patent
Ou

(10) Patent No.: US 7,459,206 B2
(45) Date of Patent: Dec. 2, 2008

(54) PANEL CONTAINING HIGHLY-CUTINIZED BAMBOO FLAKES

(75) Inventor: Nian-hua Ou, Dacula, GA (US)

(73) Assignee: Huber Engineered Woods LLC, Charlotte, NC (US)

( * ) Notice: Subject to any disclaimer, the term of this patent is extended or adjusted under 35 U.S.C. 154(b) by 406 days.

(21) Appl. No.: 11/216,655

(22) Filed: Aug. 31, 2005

(65) Prior Publication Data

US 2007/0048542 A1    Mar. 1, 2007

(51) Int. Cl.
    *B32B 21/02*    (2006.01)
(52) U.S. Cl. .................. 428/292.4; 428/297.4; 428/105
(58) Field of Classification Search ................. 428/107, 428/109, 292.4, 297.4, 105, 537.1; 442/185, 442/186, 239, 301; 144/333
See application file for complete search history.

(56) References Cited

U.S. PATENT DOCUMENTS

| | | |
|---|---|---|
| 3,684,632 A | 8/1972 | de Jesus Pedraza |
| 4,810,551 A | 3/1989 | Chu |
| 5,441,787 A | 8/1995 | Fujii et al. |
| 5,505,238 A | 4/1996 | Fujii et al. |
| 5,543,187 A | 8/1996 | Errico et al. |
| 5,543,197 A | 8/1996 | Plaehn |
| 5,759,463 A | 6/1998 | Chang |
| 5,786,063 A | 7/1998 | Shibusawa et al. |
| 5,814,170 A | 9/1998 | Shibusawa et al. |
| 5,882,745 A | 3/1999 | Mi et al. |
| 5,972,467 A | 10/1999 | Washo |
| 6,197,414 B1 * | 3/2001 | Kawai et al. ............. 428/297.4 |
| 6,224,698 B1 | 5/2001 | Endo |
| 6,281,148 B1 * | 8/2001 | Dagher et al. ................ 442/71 |
| 6,511,757 B1 | 1/2003 | Brandt et al. |
| 6,576,331 B1 * | 6/2003 | Ryan ....................... 428/297.4 |
| 6,620,459 B2 * | 9/2003 | Colvin et al. ............... 427/303 |
| 6,641,885 B2 | 11/2003 | Lou |
| 6,648,363 B2 | 11/2003 | Gordon |
| 6,689,298 B2 | 2/2004 | Yoshida |
| 6,841,231 B1 * | 1/2005 | Liang et al. ............. 428/296.7 |
| 6,881,771 B2 * | 4/2005 | Haas et al. .................... 524/14 |

FOREIGN PATENT DOCUMENTS

| | | |
|---|---|---|
| EP | 1203855 A3 | 11/2000 |
| GB | 2234935 A | 2/1991 |
| JP | 06293008 | 10/1994 |
| JP | 09279822 | 10/1997 |
| JP | 10113914 | 5/1998 |
| JP | 10115026 | 5/1998 |
| JP | 2000291236 | 10/2000 |
| JP | 2002036211 | 2/2002 |
| WO | WO96/09921 | 4/1996 |
| WO | WO03/057438 A1 | 7/2003 |

OTHER PUBLICATIONS

Jain, Seema; Kumar, Rakesh; Jindal, U.C.; Mechanical behavior of bamboo and bamboo composite, Journal of Materials Science, 1992, pp. 4598-4604, vol. 27, Chapman & Hall.

* cited by examiner

*Primary Examiner*—N Edwards

(57)    ABSTRACT

A wood composite panel includes bamboo strands cut from the outer cutinized portion of the bamboo culm and bound together with an isocyanate binder resin.

1 Claim, 1 Drawing Sheet

PANEL CONTAINING HIGHLY-CUTINIZED BAMBOO FLAKES

BACKGROUND OF THE INVENTION

Bamboo is a wood material widely used throughout Asia as a building material because of its high strength, durability and excellent dimensional stability, as well as its ready supply and rapid replenishment—bamboo grows very rapidly, reaching full maturity within 2 to 6 years, while even the fastest growing wood tree species take as long as 15 to 30 years to grow to full maturity.

However, in addition to these advantages, bamboo also has a number of disadvantages. Since bamboo is hollow it cannot be processed into solid lumber board or planks.

And not only is it impossible to make solid lumber from, but bamboo can also not be processed by the conventional techniques used to make wood composite materials. For example, it is difficult to make plywood from bamboo because the bamboo culms are too thin to cut plywood veneers from. Nor has bamboo been successfully processed by techniques used to make strand composite wood materials (which are composite materials made from resin-coated strands given a preferred orientation and deposited in that orientation on an underpassing conveyor belt).

Despite these disadvantages, because of bamboo's ready supply and excellent performance characteristics, manufacturers have developed techniques to make wood composite materials out of bamboo. For example, composite bamboo structural panels may be made by hand-cutting bamboo strands from the outer part or surface of a bamboo culm, and then weaving (again typically by hand) the strands into mats. These hand-cut, hand-woven bamboo mats are then stacked together along with several other similar mats and the mats then pressed together under high temperature.

The problem with this method of manufacture of the bamboo boards is that it is time consuming; the steps of cutting the bamboo strips and then weaving the bamboo strips into the form of a mat take a significant amount of time. And not only are these processes time consuming, but they can lead to significant defects in the final board product. For example, internal gaps created by the layering of several of the mats on top of another can result in the production of holes or other defects in the board that can lead to failure. Additionally, bonding two woven bamboo mats together involves bonding together two mating surfaces, which is an additional source for defects. Yet another disadvantage of the aforementioned processes is that because they are composed of large numbers of bamboo layers, they are require very high doses of resin per layer, which adds greatly to the price of the product during periods of high petroleum prices.

Given the foregoing there is a need in the art for structural bamboo panels that are either partly or completely composed of bamboo, have fewer defects, do not require a lengthy manufacturing process, and consume a smaller amount of petroleum-based products.

BRIEF SUMMARY OF THE INVENTION

The present invention relates to a wood panel comprising bamboo strands cut from the outer portion of the bamboo culm.

DETAILED DESCRIPTION OF THE INVENTION

Figure 1:
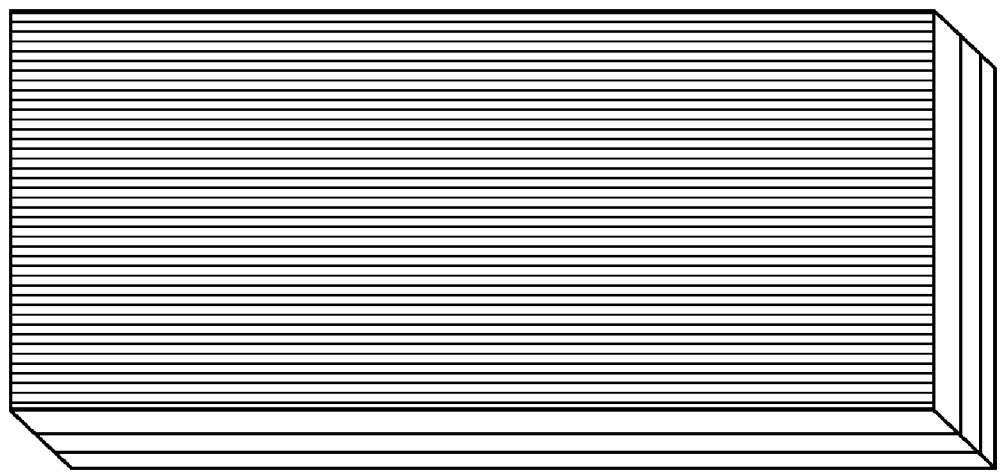
FIG. 1 is a schematic representation of a panel according to an example embodiment of the present invention.

All parts, percentages and ratios used herein are expressed by weight unless otherwise specified. All documents cited herein are incorporated by reference.

As used herein, "lignocellulosic material" is intended to mean a cellular structure, having cell walls composed of cellulose and hemicellulose fibers bonded together by lignin polymer. Wood is a species of lignocellulosic material.

By "wood composite material" or "wood composite component" it is meant a composite material that comprises lignocellulosic material and one or more other additives, such as adhesives or waxes. Non-limiting examples of wood composite materials include structural composite lumber ("SCL"), waferboard, particle board, chipboard, medium-density fiberboard, plywood, and boards that are a composite of strands and ply veneers. As used herein, "flakes", "strands", and "wafers" are considered equivalent to one another and are used interchangeably. A non-exclusive description of wood composite materials may be found in the Supplement Volume to the Kirk-Othmer Encyclopedia of Chemical Technology, pp 765-810, $6^{th}$ Edition, which is hereby incorporated by reference.

The following describes preferred embodiments of the present invention, which provide a SCL wood panel comprising bamboo strands cut from the outer portion of the bamboo culm. SCL products include laminated veneer lumber ("LVL"), parallel strand lumber ("PSL"), laminated strand lumber ("LSL"), Oriented strand lumbers ("OSL"), and oriented strand board ("OSB"), which will be described in greater detail below.

Forming a SCL product from strands cut from the outer portion of the bamboo culm results in a SCL wood panel having excellent strength durability characteristics because the outer portion of the bamboo culm is the strongest and most durable part of the bamboo culm.

Previously, attempts to use flakes from the outer portion of the bamboo culm have been frustrated because conventional wood composite resins (like phenol formaldehyde) could not penetrate into the flakes taken from the outer layer (because of the waxy and highly-cutinized surface coating of the flakes) and consequently failed to form strong bonds between adjacent flakes.

This problem has been solved in the present invention by the use of one or more isocyanate binder resins, preferably the isocyanates are selected from the diphenylmethane-p,p'-diisocyanate group of polymers, which have NCO— functional groups that can react with other organic groups to form polymer groups such as polyurea, —NCON—, and polyurethane, —NCOON—; a binder with about 50 wt % 4,4-diphenylmethane diisocyanate ("MDI") or in a mixture with other isocyanate oligomers ("pMDI") is preferred. A suitable commercial pMDI product is Rubinate 1840 available from Huntsman, Salt Lake City, Utah, and Mondur 541 available from Bayer Corporation, North America, of Pittsburgh, Pa. Also suitable for use are phenol formaldehyde ("PF"), melamine formaldehyde, melamine urea formaldehyde ("MUF") and the co-polymers thereof. Suitable commercial MUF binders are the LS 2358 and LS 2250 products from the Dynea corporation.

Without wishing to be limited by theory, it is believed that MDI functions better than previously existing resin systems because the MDI is a smaller molecule than most polymer binder resins, and—of equal importance—because the MDI has a similar solubility with the wax coating found on the surface of the outer culm bamboo flakes.

The bamboo material will now be described in greater detail, and subsequently methods of incorporating bamboo strands into a composite material will be discussed in detail.

Like other wood materials, bamboo's basic components are cellulose fibers bonded together by lignin polymer, but bamboo differs from other wood materials in the organization and morphology of its constituent cells. Generally, most strength characteristics of bamboo (tensile strength, flexural strength and rigidity) are greatest in the longitudinal direction of the bamboo and the bamboo fibers. This is due to the relatively small micro-fibrillar angle of the cellulose fibers in the longitudinal direction. The hardness of the bamboo culm itself is dependent on the density of bamboo fibers bundles and their manner of separation. The percentage of fibers does not consist either in the longitudinal direction of the bamboo culm or in a cross section of the culm. In the longitudinal direction, the density of fibers increases from the bottom of the culm to its top, while the density of fibers in the bamboo culm cross-section is highest closer to the outer surface and decreases going deeper into the core of the material. Moreover, the strength and hardness of the outer portion of the bamboo culm is further increased by the presence of the silica-deposited, cutinized layer coated with wax, which covers the surface of the outer part of the culm. Thus, the bamboo on or near the outer surface of the culm has superior strength characteristics, but in most processes for making use of bamboo fibers, these improved strength properties are not exploited because the outer portion of the culm is stripped off. Unlike previous techniques for using bamboo wood in which the cutinized layer is stripped off and thus the strongest part of the culm discarded, in the present invention the cutinized layer is used and thus the high strength properties of the bamboo are maintained.

Thus, when properly utilized the cellulose fibers in bamboo are stiffer and stronger than the fibers of most wood species, so that boards incorporating bamboo could have a much higher strength to weight ratio than boards made from other types of wood fibers.

In the present invention the bamboo culm strands are sorted depending on their location in the outer portion of the bamboo culm into strands that come from: (a) the outer third of the bamboo culm, (b) preferably the portion of the bamboo culm that is within 2 mm of the outer diameter of the bamboo culm. For improved compatibility and adhesion with the conventional wood strands, the bamboo strands are preferably cut into thicknesses of less than about 0.2 inch, such as less than 0.15 inches, such as in the range of about 0.01 inches to about 0.15 inches; and cut into widths of preferably greater than about 0.1 inches, such as more than about 0.15 inches, such as more than about 0.5 inches. This cutting may be done either manually or with mechanized clipping equipment. For purposes of improved strength the bamboo strands should be cut along the longitudinal axis into strands preferably longer than about 2 inches, such as about 3 inches, such as about 5 inches. While not intending to be limited by theory, it is believed that the longer strip length will result in more closely aligned strands when the strands are oriented using a disk strand orienter, and without being limited by theory, it is believed that more closely aligned strands will result in a final wood composite board product that has an improved modulus of elasticity along the longitudinal axis.

After being cut, the bamboo strands are dried (as described below) and coated with isocyanate polymeric resin (as described above). The binder concentration of the isocyante resin is in the range of about 2 wt % to about 12 wt %, based on the dry weight of the bamboo. A wax additive is commonly employed to enhance the resistance of the bamboo strands to moisture penetration. Preferred waxes are slack wax or an emulsion wax. The wax solids loading level is preferably in the range of about 0.1 wt % to about 3.0 wt % (based on the weight of the bamboo). After being coated with As used in the present invention the bamboo is formed into strand composite lumber panels, preferably OSB panels. The panels may be made entirely from bamboo strands, or instead the bamboo strands may be mixed with naturally occurring hard or soft woods, singularly or mixed, whether such wood is dry (having a moisture content of between 2 wt % and 12 wt %) or green (having a moisture content of between 30 wt % and 200 wt %). Typically, the raw wood starting materials, either virgin or reclaimed, are cut into strands, wafers or flakes of desired size and shape, which are well known to one of ordinary skill in the art. When the panels are made from a combination of both the bamboo strands and naturally occurring hard or soft woods, the two separate sets of woods are separately dried and coated with polymer resin binder, and then after the separate coating stages the coated hard/soft wood strands and coated bamboo strands are admixed together.

After the strands are cut they are dried in an oven and then coated with a special formulation of one or more polymeric thermosetting binder resins, waxes and other additives. The binder resin and the other various additives that are applied to the wood materials are referred to herein as a coating, even though the binder and additives may be in the form of small particles, such as atomized particles or solid particles, which do not form a continuous coating upon the wood material. Conventionally, the binder, wax and any other additives are applied to the wood materials by one or more spraying, blending or mixing techniques, a preferred technique is to spray the wax, resin and other additives upon the wood strands as the strands are tumbled in a drum blender.

After being coated and treated with the desired coating and treatment chemicals, these coated strands are used to form a multi-layered mat, preferably a three layered mat which is then pressed to form a composite wood component as generally shown in FIG. 1. This layering may be done in the following fashion. The coated flakes are spread on a conveyor belt to provide a first ply or layer having flakes oriented substantially in line, or parallel, to the conveyor belt, then a second ply is deposited on the first ply, with the flakes of the second ply oriented substantially perpendicular to the conveyor belt. Finally, a third ply having flakes oriented substantially in line with the conveyor belt, similar to the first ply, is deposited on the second ply such that plies built-up in this manner have flakes oriented generally perpendicular to a neighboring ply. Alternatively, but less preferably, all plies can have strands oriented in random directions. The multiple plies or layers can be deposited using generally known multi-pass techniques and strand orienter equipment. In the case of a three ply or three layered mat, the first and third plies are surface layers, while the second ply is a core layer. The surface layers each have an exterior face.

The above example may also be done in different relative directions, so that the first ply has flakes oriented substantially perpendicular to conveyor belt, then a second ply is deposited on the first ply, with the flakes of the second ply oriented substantially parallel to the conveyor belt. In the present invention, the longitudinal edge of the board is formed parallel to the conveyor belt, so that flakes oriented substantially parallel to the conveyor belt will be oriented substantially arranged substantially parallel to the conveyor belt, will end up being substantially parallel to the longitudinal edge of the final wood panel product. Finally, a third ply having flakes oriented substantially perpendicular with the conveyor belt, similar to the first ply, is deposited on the second ply.

In the present invention there is another possible panel configuration. In this configuration one or more layers are built up according to the aforementioned process to form the layers sufficient to form a composite wood component, and then a layer of bamboo strands is formed on top of these layers, with the bamboo strands substantially oriented in a direction parallel to the longitudinal edges to form a bamboo veneer layer. The binder resins used with the bamboo strands in this bamboo layer are as described above, and this bamboo layer and its accompanying wood layers are processed as described in the following paragraphs.

As discussed above, an important part of the present invention is the use of isocyanate binder resins with the bamboo strands. However, with conventional pine, aspen or the like wood strands, conventional polymeric binder resins commonly used with wood composites may be used. These resins include urea-formaldehyde, polyvinyl acetate ("PVA"), phenol formaldehyde, melamine formaldehyde, melamine urea formaldehyde ("MUF"), the isocyantes mentioned and the co-polymers thereof.

Isocyanates are the preferred binders, and preferably the isocyanates are selected from the diphenylmethane-p,p'-diisocyanate group of polymers, which have NCO— functional groups that can react with other organic groups to form polymer groups such as polyurea, —NCON—, and polyurethane, —NCOON—; a binder with about 50 wt % 4,4-diphenylmethane diisocyanate ("MDI") or in a mixture with other isocyanate oligomers ("pMDI") is preferred.

As mentioned above, MDI is used in the present invention as the polymeric resin; in addition to the 4,4-diphenyl-methane diisocyanate ("MDI") mentioned above other isocyanate oligomers ("pMDI") may be used. A suitable commercial pMDI product is Rubinate 1840 available from Huntsman, Salt Lake City, Utah, and Mondur 541 available from Bayer Corporation, North America, of Pittsburgh, Pa. Other polymeric resins may be used as well in a resin blend. For example the MDI loading levels may be slightly reduced by inclusion of a small amount of phenol formaldehyde.

The binder concentration in the non-bamboo layers is preferably in the range of about 0.2 wt % to about 2 wt %. A wax additive is commonly employed to enhance the resistance of the OSB panels to moisture penetration. Preferred waxes are slack wax or an emulsion wax. The wax solids loading level is preferably in the range of about 0.1 wt % to about 3.0 wt % (based on the weight of the wood).

After the multi-layered mats are formed according to the process discussed above, they are compressed under a hot press machine that fuses and binds together the wood materials, binder, and other additives to form consolidated OSB panels of various thickness and sizes. The high temperature also acts to cure the binder material. Preferably, the panels of the invention are pressed for 2-15 minutes at a temperature of about 175° C. to about 240° C. The resulting composite panels will have a density in the range of about 35 lbs/ft$^3$ to about 48 lbs/ft$^3$ (as measured by ASTM standard D1037-98). The density ranges from 40 lbs/ft$^3$ to 48 lbs/ft$^3$ for southern pine, and 35 lbs lbs/ft$^3$ to 42 lbs/ft$^3$ for Aspen. The thickness of the OSB panels will be from about 0.6 cm (about ¼") to about 5 cm (about 2"), such as about 1.25 cm to about 6 cm, such as about 2.8 cm to about 3.8 cm.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A panel, the panel having parallel first and second longitudinal edges, comprising:
   a composite wood component having an upper surface layer;
   a bamboo layer located on top of the upper surface layer, the bamboo layer comprised of bamboo strands substantially oriented in a direction parallel to the longitudinal edges, wherein the bamboo strands are cut from the outer portion of the bamboo culm and the strands are bonded to each other by an isocyanate binder resin,
   wherein the composite wood component is composed of strands selected from aspen wood and pine wood.

* * * * *